United States Patent Office 2,897,086
Patented July 28, 1959

2,897,086

COLD SWELLING STARCH PRODUCT

Ernest A. Sowell, St. Louis, and Richard L. Curtin, Ferguson, Mo., Barbara A. Hall, Chicago, Ill., and Barrett L. Scallet, Clayton, Mo., assignors to Anheuser-Busch, Incorporated, St. Louis, Mo., a corporation of Missouri No Drawing. Application February 15, 1957
Serial No. 640,327

4 Claims. (Cl. 99—139)

The present invention relates generally to starch products, and more particularly to an "instant" or cold swelling starch product for use with instant pudding mixtures and like food products.

An "instant" pudding is a well-known type of dessert which can be prepared within a few minutes by merely adding and mixing an instant pudding mixture with cold water or cold milk. The known instant pudding mixtures usually contain precooked or cold swelling starch, sweetening agents, flavoring, coloring, and salts of one type or another for forming a coagulum or gel between the milk or water and the cold swelling starch.

In order to be commercially acceptable, it is necessary that the instant pudding mixture have certain desirable characteristics and that it lack the various undesirable characteristics which have been associated with some of the known instant pudding mixtures.

In general, the pudding should be ready for serving within a few minutes after mixing with the milk or water and without any heating or cooking. It should also have the proper type of gel consistency without being tacky or gummy. In addition, it should be free of undesirable stringiness, toughness, and off-flavors, and the dry mix should be capable of being stored for long periods of time without developing any of these undesirable characteristics, particularly off-flavors.

For the most part, the undesirable characteristics are imparted to the pudding mix by the cold swelling starch. Thus, for example, potato starch, tapioca, or arrowroot starches when precooked and incorporated into a pudding mix, form gels which are tough, cohesive, and generally unsatisfactory from the consistency standpoint. Although the consistency of these starches can be improved by pretreatment of the starch by various methods, the pretreatment is not always practical or completely successful. Other starches such as corn, wheat, rice, sorghum, waxy maize and waxy sorghum do not produce a gel of a proper consistency, or, if the consistency is satisfactory, some undesirable flavor peculiar to the particular starch is noted in the pudding. These off-flavors have been described by some individuals as "woody," "corny," "starchy," "bitey" and "chalky."

It is an object of the present invention, therefore, to provide a novel cold swelling starch product for use with instant pudding mixtures and the like, which has all of the desirable characteristics of such a product without any of the undesirable characteristics sometimes associated therewith. More particularly, it is an object to provide such a product which produces a gel of the proper consistency and which is not tough or stringy, and which does not have any off-flavor. Specifically, it is an object to provide a "natural" starch product of this type as differentiated from one which has been pretreated or chemically conditioned, which has a long shelf life, which produces a gel of the proper consistency, which is not tough and stringy, and which does not have any off-flavor.

Further objects and advantages of the present invention will be apparent from the following detailed descriptions and examples.

Briefly, the present invention comprises the combination of potato starch and wheat starch together with a medium converted corn syrup, the components being mixed together and then pregelatinized, dried, and pulverized.

We have discovered that the usual tough, rubbery, tenacious characteristics of a cold swelling potato starch can be eliminated if wheat starch is added to the potato starch slurry prior to pregelatinization. The presence of the wheat starch not only removes the aforementioned undesirable textural qualities, but it also produces a tender, firm and smooth type of gel. In addition, the amount of syneresis of the prepared pudding is decreased by the use of the wheat starch.

The taste of the resultant pudding is also completely free of undesirable off-flavors, and the dry pudding starch mix has excellent taste stability over long periods of time.

The ratio of the potato starch to the wheat starch may vary from about 3:1 to about 6:1 but it is preferable to use a ratio in the neighborhood of about 3.5:1.

We have also found that the addition of sugar or corn syrup to the potato starch-wheat starch mixture aids in the removal of the dried starch sheet from the drum drier and also aids the rate of swelling of the starch when it is added to the milk or water.

Although dried sugar, i.e. either dextrose or sucrose can be used, it was determined that from the standpoint of economy and flavor, medium converted corn syrup of about 42 D.E. was the most satisfactory. The usual higher converted syrups which have a bitter flavor should not be used. Also, dextrose may have an undesirable flavor, and the use of sucrose may result in a pudding which is too sweet if the remainder of the mix is not adjusted to compensate for the high degree of sweetness of the sucrose.

The amount of corn syrup which is used should be in the neighborhood of from about 5% to about 25% (solids basis), by weight, based on the total dry weight. We prefer to use about 10% of 42 D.E. corn syrup, solids basis.

Thus, with 5% C.S.U. solids, the percentage of potato starch can vary from about 72 to about 80 and the percentage of wheat starch can vary from about 23 to about 15. On the other hand, with 25% C.S.U. solids, the potato starch can vary from about 57% to about 65% and the wheat starch from about 18% to about 10%. The preferred ratio is about 10% C.S.U. solids, about 70% potato starch, and about 20% wheat starch.

The following examples of the composition and method of producing our novel cold swelling starch product are given to illustrate our invention.

Example No. 1

The potato starch which is to be used should be free of undesirable odor and color, and the Scott fluidity should be at least 1,000.

The wheat starch should be a normal thick-boiling starch having a Scott fluidity of about 50. We prefer to use a spray dried wheat starch because it has a better flavor.

About 350 pounds of potato starch, about 100 pounds of wheat starch, and about 50 pounds of 42 D.E. corn syrup (dry basis) are slurried with water to produce a mix having a solids concentration of about 30% to 40%. We prefer this solids level because the slurry can be easily agitated and pumped from one operation to another, and it is also a suitable solids level for economical drum drying.

The starch-sugar slurry is then precooked, as by passing it through a Votator heat exchanger, after which it is passed to the drum drier.

After drum drying, the material is pulverized so that about 95% of it will pass through a U.S. #200 mesh sieve.

*Example No. 2*

The same process as set forth in Example No. 1 was used, except that we employed 400 pounds of potato starch, 75 pounds of wheat starch, and 25 pounds of C.S.U. solids.

*Example No. 3*

Same process as previously described except that we employed 360 pounds of potato starch, 115 pounds of wheat starch and 25 pounds of C.S.U. solids.

*Example No. 4*

Same process as described above, with 325 pounds of potato starch, 50 pounds of wheat starch, and 125 pounds of C.S.U. solids.

*Example No. 5*

Same process as in Example No. 1, with 285 pounds of potato starch, 90 pounds of wheat starch, and 125 pounds of C.S.U. solids.

Thus, it will be apparent that there has been provided a novel cold swelling starch product which fulfills all of the objects and advantages sought therefor.

It is to be understood that the foregoing description and examples have been given only by way of illustration, and that both the product and process are susceptible of variation without departing from the scope of the invention, which is limited only by the claims which follow.

What is claimed is:

1. A cold swelling starch product containing as the principal and essential starch ingredients pregelatinized potato starch and pregelatinized wheat starch, the starches having been intimately mixed prior to gelatinization whereby the wheat starch coacts with the potato starch to cause the potato starch to lose its usual tough, rubbery, tenacious characteristics and results in a product which forms a tender, firm, and smooth gel when mixed with cold water, said starch product being substantially free of any deleterious flavor upon aging.

2. A cold swelling starch product containing as the principal and essential starch ingredients from about 3 to about 6 parts of pregelatinized potato starch by weight for each 1 part by weight of pregelatinized wheat starch, the starches having been intimately mixed prior to gelatinization whereby the wheat starch coacts with the potato starch to cause the potato starch to lose its usual tough, rubbery, tenacious characteristics and results in a product which forms a tender, firm, and smooth gel when mixed with cold water, said starch product being substantially free of any deleterious flavor upon aging.

3. A cold swelling starch product comprising pregelatinized potato starch, pregelatinized wheat starch and sugar, the starches and sugar having been intimately mixed prior to gelatinization whereby the wheat starch coacts with the potato starch to cause the potato starch to lose its usual tough, rubbery, tenacious characteristics and results in a product which forms a tender, firm, and smooth gel when mixed with cold water, said starch product being substantially free of any deleterious flavor upon aging.

4. A cold swelling starch product comprising between about 57% to about 80% by weight pregelatinized potato starch, from about 10% to about 23% pregelatinized wheat starch, and between about 5% to about 25% by weight sugar, the starches and sugar having been intimately mixed prior to gelatinization whereby the wheat starch coacts with the potato starch to cause the potato starch to lose its usual tough, rubbery, tenacious characteristics and results in a product which forms a tender, firm, and smooth gel when mixed with cold water, said starch product being substantially free of any deleterious flavor upon aging.

References Cited in the file of this patent
UNITED STATES PATENTS

| | | |
|---|---|---|
| 2,257,599 | Frischmuth et al. | Sept. 30, 1941 |
| 2,314,459 | Salzburg | Mar. 23, 1943 |
| 2,500,179 | Hinz et al. | Mar. 14, 1950 |
| 2,613,150 | Halden | Oct. 7, 1952 |